(12) United States Patent
Sim

(10) Patent No.: US 10,068,482 B2
(45) Date of Patent: Sep. 4, 2018

(54) DRIVING ASSISTANT DEVICE AND DRIVING ASSISTANT METHOD

(71) Applicant: MANDO CORPORATION, Pyeongtaek-si, Gyeonggi-do (KR)

(72) Inventor: Sang Kyun Sim, Anyang-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 111 days.

(21) Appl. No.: 15/214,449

(22) Filed: Jul. 20, 2016

(65) Prior Publication Data

US 2017/0032678 A1 Feb. 2, 2017

(30) Foreign Application Priority Data

Jul. 29, 2015 (KR) .......................... 10-2015-0107035

(51) Int. Cl.
| | |
|---|---|
| *G08G 1/16* | (2006.01) |
| *B60W 10/18* | (2012.01) |
| *B60W 10/20* | (2006.01) |
| *B60W 10/30* | (2006.01) |
| *B60W 30/12* | (2006.01) |

(52) U.S. Cl.
CPC ............ *G08G 1/167* (2013.01); *B60W 10/18* (2013.01); *B60W 10/20* (2013.01); *B60W 10/30* (2013.01); *B60W 30/12* (2013.01); *G08G 1/163* (2013.01); *G08G 1/166* (2013.01); *B60W 2420/42* (2013.01); *B60W 2550/10* (2013.01); *B60W 2550/14* (2013.01); *B60W 2710/18* (2013.01); *B60W 2710/20* (2013.01); *B60W 2710/30* (2013.01)

(58) Field of Classification Search
CPC ...... B60W 10/18; B60W 10/20; B60W 10/30; B60W 2420/42; B60W 2550/10; B60W 2550/14; B60W 2710/18; B60W 2710/20; B60W 2710/30; B60W 30/12; G08G 1/163; G08G 1/166; G08G 1/167
See application file for complete search history.

(56) References Cited

U.S. PATENT DOCUMENTS

| | | | |
|---|---|---|---|
| 2018/0012085 A1* | 1/2018 | Blayvas | ............ G06K 9/00805 |
| 2018/0032891 A1* | 2/2018 | Ba | .......................... G06N 7/005 |
| 2018/0105180 A1* | 4/2018 | Fung | ........................ B62D 6/00 |

\* cited by examiner

*Primary Examiner* — Khoi H Tran
*Assistant Examiner* — Robert T Nguyen
(74) *Attorney, Agent, or Firm* — Hauptman Ham, LLP

(57) ABSTRACT

A driving assistant device includes: a detection unit configured to detect at least one of an edge of a road, a lane of the road, and an object positioned within a certain range on the road; a calculation unit configured to calculate distance from the edge, distance from the lane, distance from the object, and speed of the object, and to calculate time to collision (TTC) with each of the edge, the lane, and the object based on the calculated distances and speed; a management unit configured to set a risk level of at least each one of the edge, the lane, and the object, and to adjust the risk level based on the TTC; and a control unit configured to control at least one of an indicator, a steering system, a brake, a headrest, and a belt according to the risk level.

14 Claims, 12 Drawing Sheets

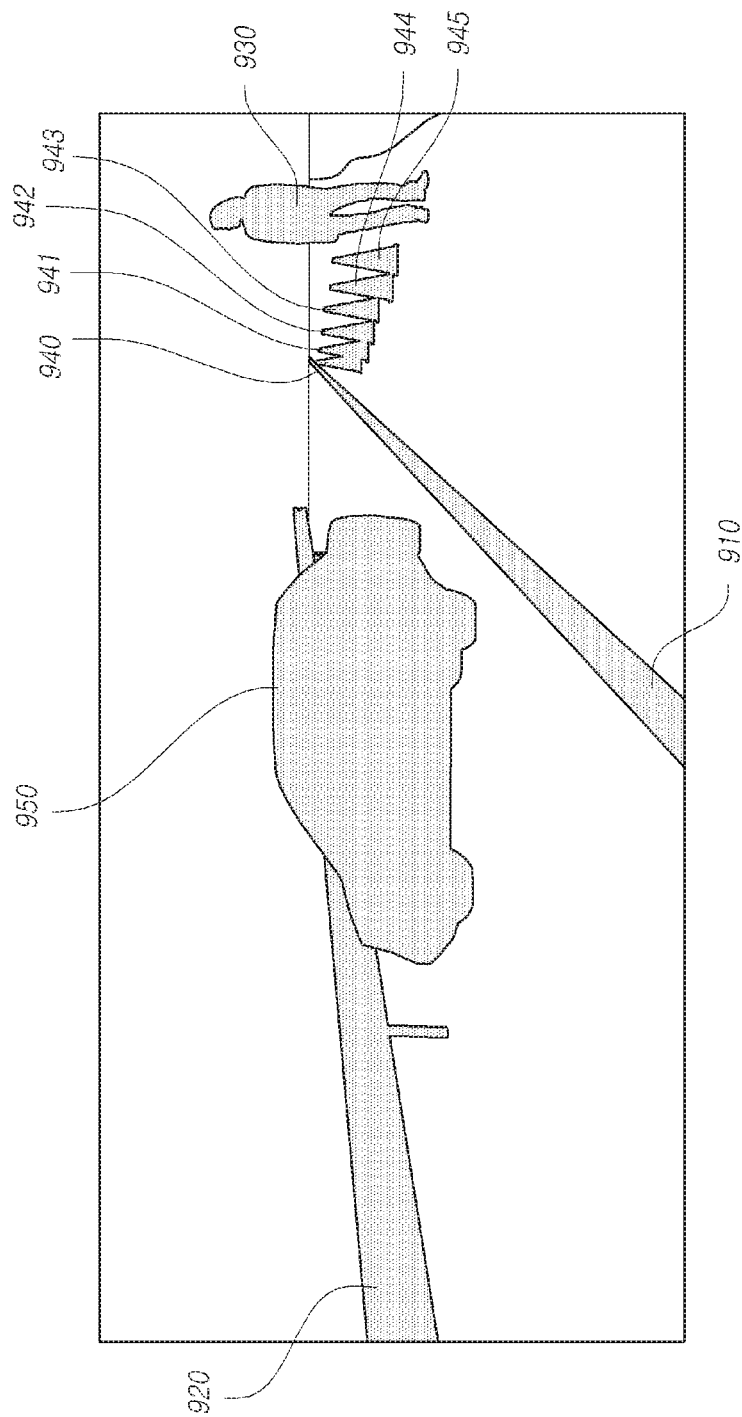

DRIVING ASSISTANT DEVICE AND DRIVING ASSISTANT METHOD

CROSS REFERENCE TO RELATED APPLICATION

This application claims priority from Korean Patent Application No. 10-2015-0107035, filed on Jul. 29, 2015, which is hereby incorporated by reference for all purposes as if fully set forth herein.

BACKGROUND OF THE INVENTION

1. Field of the Invention

The present invention relates to a driving assistant technique that is applied to a car.

2. Description of the Prior Art

A car is equipped with an indicator to notify the driver of a specific situation, a steering system to manipulate the driving direction of the car, a brake to stop the running car, a headrest to support the driver's head for comfort, and a belt to protect the driver from sudden braking of the car.

The indicator notifies the driver of the conditions of the car, the steering system and the brake operate according to driver's control, and the headrest and the belt function according to the manufactured features or according to settings made by the driver before driving.

Meanwhile, the car may be exposed to various situations while driving. Although the indicator reports various conditions to which the car is exposed, it is almost impossible in reality for the driver to control the steering system and the brake and to set the headrest and the belt in order to suit the various situations.

SUMMARY OF THE INVENTION

Therefore, the present invention has been made in view of the above-mentioned problems, and an aspect of the present invention is to provide a device and a method for controlling an indicator, a steering system, a brake, a headrest, and a belt according to various situations to which a running car may be exposed.

In accordance with an aspect of the present invention, there is provided a driving assistant device including: a detection unit configured to detect at least one of an edge of a road, a lane of the road, and an object positioned within a certain range on the road; a calculation unit configured to calculate distance from the edge, distance from the lane, distance from the object, and speed of the object, and to calculate time to collision (TTC) with each of the edge, the lane, and the object based on the calculated distances and speed; a management unit configured to set a risk level of at least each one of the edge, the lane, and the object, and to adjust the risk level based on the TTC; and a control unit configured to control at least one of an indicator, a steering system, a brake, a headrest, and a belt according to the risk level.

In accordance with another aspect of the present invention, there is provided a driving assistant method including: a detection operation of detecting at least one of an edge of a road, a lane of the road, and an object positioned within a certain range on the road; a calculation operation of calculating distance from the edge, distance from the lane, distance from the object, and speed of the object, and of calculating TTC with each of the edge, the lane, and the object based on the calculated distances and speed; a management operation of setting a risk level of at least each one of the edge, the lane, and the object, and of adjusting the risk level based on the TTC; and a control operation of controlling at least one of an indicator, a steering system, a brake, a headrest, and a belt according to the highest level of the risk levels.

As described above, the present invention may provide a device and a method for controlling an indicator, a steering system, a brake, a headrest, and a belt according to various situations to which a running car may be exposed.

BRIEF DESCRIPTION OF THE DRAWINGS

The above and other objects, features, and advantages of the present invention will be more apparent from the following detailed description taken in conjunction with the accompanying drawings, in which:

FIG. 9B illustrates still another example for describing an operation of the detection unit according to the embodiment of the present invention.

DETAILED DESCRIPTION OF THE EXEMPLARY EMBODIMENTS

Figure 1:
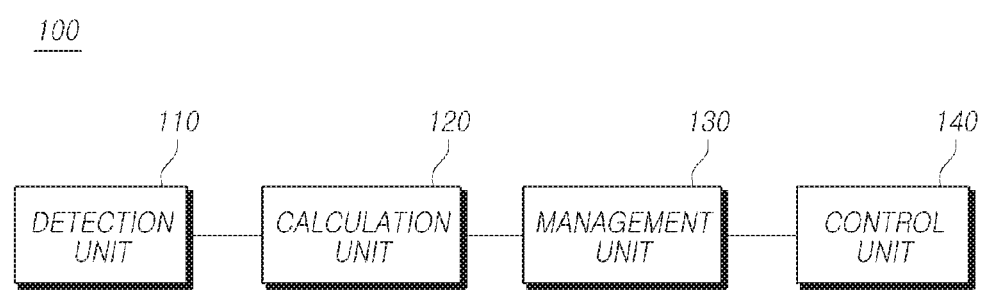
FIG. 1 illustrates a configuration of a driving assistant device according to an embodiment of the present invention.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a configuration of a driving assistant device according to an embodiment of the present invention.

Referring to FIG. 1, the driving assistant device 100, according to the embodiment of the present invention, may include a detection unit 110 to detect at least one of an edge of a road, a lane of the road, and an object positioned within a certain range on the road; a calculation unit 120 to calculate the distance from the edge, the distance from the lane, the distance from the object, and the speed of the object, and to calculate time to collision (TTC) with each of the edge, the lane, and the object based on the calculated distances and speed; a management unit 130 to set a risk level of at least one of the edge, the lane, and the object of the road, and to adjust the risk level based on the TTC; and a control unit 140 to control at least one of an indicator, a steering system, a brake, a headrest, and a belt according to the risk level.

For example, the detection unit 110 may detect the edge, the lane, and the object of the road using a charge coupled device (CCD) camera that employs a CCD.

The CCD is a sensor that converts light into electric charges to obtain an image, and includes a circuit in which a plurality of condensers is connected to each other in pairs and each condenser transfers fully accumulated electric charges to adjacent condensers to obtain an image. When a CCD chip formed of CCDs is exposed to light, electrons are generated according to the amount of photons and information of the amount of electrons in a corresponding CCD corresponding to brightness is restructured, thereby generating image information forming a screen.

For another example, the detection unit 110 may detect the edge, the lane, and the object of the road using a stereo-camera that is equipped with two lenses to obtain two images at the same time. For easier understanding, the stereo-camera may detect an object in a similar manner that people detect an object with the eyes to determine distance. The stereo-camera may detect an object in three dimensions using the lenses installed right and left side by side at an interval of about 6.5 to 7 cm, similar to the distance between the human eyes (about 6 to 7 cm).

The object may be street furniture installed on the road, a pedestrian or bicycle rider crossing the road, a car running on the road, and a thing placed on the road. The thing may be detected by the detection unit 110 but is not included in a list of items previously stored. The street furniture may include a kerb that is placed to be stationary around the road, an outer wall, a median strip, a guardrail, and the like.

As described above, the detection unit 110 may use the CCD camera or stereo-camera to detect the edge, the lane of the road, and the object positioned within the certain range on the road, but is not limited thereto. That is, the detection unit 110 may use any device that is capable of detecting an edge of a road, a lane of the road, and an object positioned within a certain range on the road.

The calculation unit 120 may calculate the distances from the edge, the lane of the road, and the object positioned within the certain range on the road, which are detected by the detection unit 110.

For example, the calculation unit 120 may calculate the distances using distances from a known position in advance on images taken by the detection unit 110.

Further, the calculation unit 120 may detect the edge, the lane of the road, and the object positioned within the certain range on the road at regular intervals, thereby calculating the changed distances from the edge, the lane of the road, and the object positioned within the certain range on the road for a certain period of time. In addition, the calculation unit 120 may calculate the speeds of the edge, the lane of the road, and the object positioned within the certain range on the road, respectively, and may further calculate TTCs respectively with the edge, the lane of the road, and the object positioned within the certain range on the road based on the changed distances and the speeds.

The management unit 130 may set the risk level of each of the edge, the lane of the road, and the object positioned within the certain range on the road, which are detected by the detection unit 110.

For example, the management unit 130 may set the risk level of each of the edge, the lane of the road, and the object positioned within the certain range on the road based on preset risk level data by item.

Specifically, when a driver's car steps on or crosses a lane classified as a low risk level, a traffic accident may occur depending on the situation, which may be less likely to happen. On the contrary, when the driver's car touches a pedestrian classified as a high risk level or further moves to hit the pedestrian, the pedestrian may be injured, or even die depending on the situation. Accordingly, the management unit 130 may set higher risk levels for the lane, street furniture and thing, the edge of the road, a vehicle, and a pedestrian in ascending order.

Further, the management unit 130 may adjust the risk level set for each of the lane, street furniture and thing, the edge of the road, the vehicle, and the pedestrian based on the TTCs calculated by the calculation unit 120.

For example, the management unit 130 may raise the risk level based on a relationship between TTCs and preset time zones. The time zones may be set differently for the lane, street furniture and thing, the edge of the road, the vehicle, and the pedestrian based on experimental data.

The control unit 140 may control at least one of the indicator, the steering system, the brake, the headrest, and the belt included in the driver's car according to the risk level managed by the management unit 130.

For example, when the management unit 130 manages the risk levels in four grades, the control unit 140 may: operate the indicator in risk level 1, which is the lowest risk level; control one or more of the indicator and the steering system in a next level, which is risk level 2; control one or more of the indicator, the steering system, and the brake in risk level 3; and control one or more of the indicator, the steering system, the brake, the headrest, and the belt in risk level 4, which is the highest risk level.

For another example, in a state where the management unit 130 sets the risk levels of the lane, the street furniture, the object, the edge of the road, the vehicle, and the pedestrian to be risk level 1, risk level 2, risk level 2, risk level 3, risk level 3, and risk level 4, respectively, when the detection unit 110 detects the lane, the street furniture, the object, the edge of the road, the vehicle, and the pedestrian, the control unit 140 may: control the indictor according to risk level 4, which is the highest risk level, to provide a notification to the driver; control the steering system to avoid a collision with the pedestrian corresponding to risk level 4; control the brake so as to avoid a collision with the pedestrian corresponding to risk level 4; and control to adjust the headrest and the belt so that the driver has less impact.

The aforementioned control operations of the control unit 140 are illustrative examples, without being limited thereto.

Figure 2:
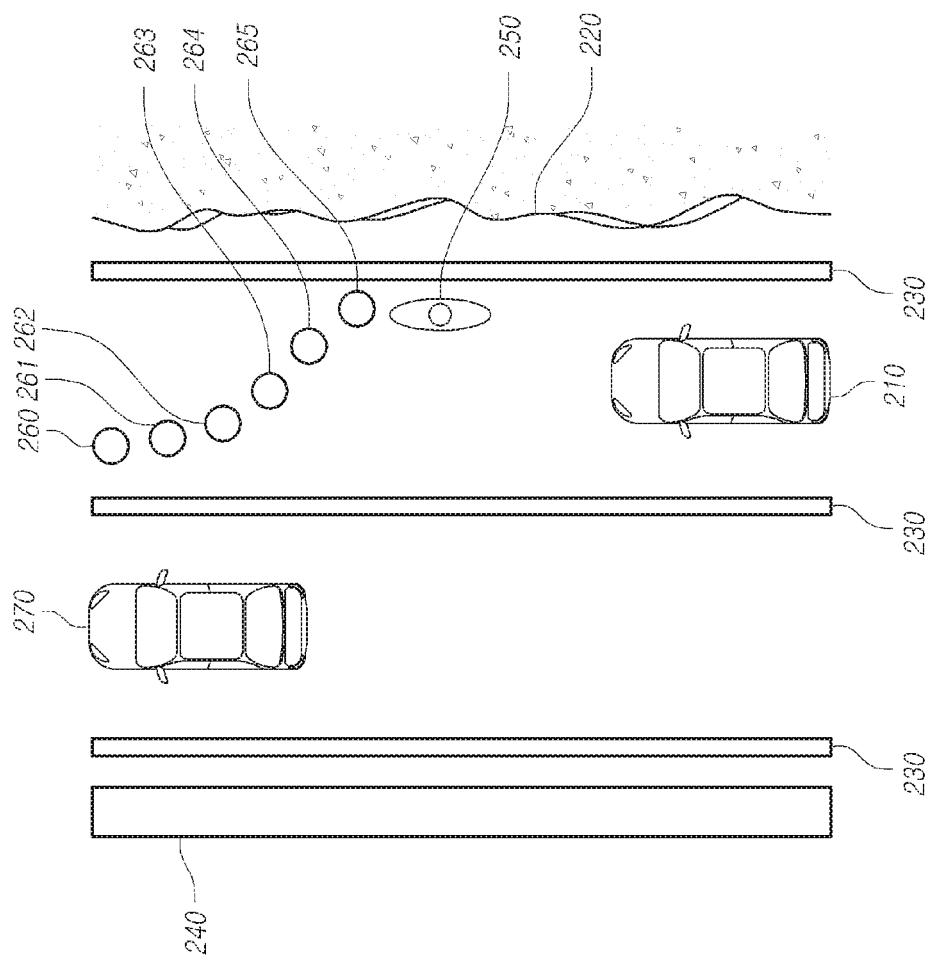
FIG. 2 illustrates an example of a situation for describing an operation of the driving assistant device according to the embodiment of the present invention.
Figure 3:
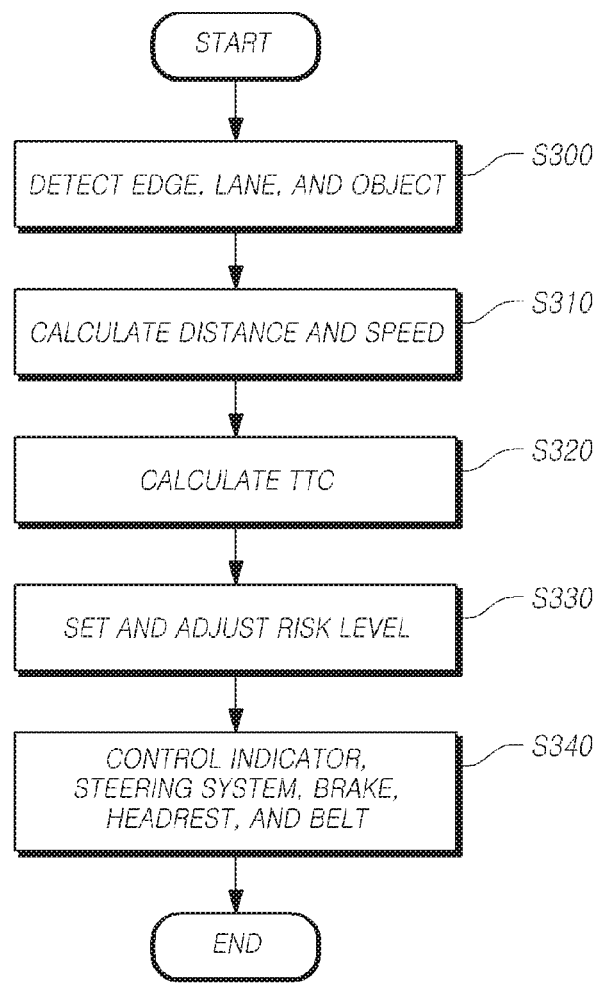
FIG. 3 illustrates an example for describing an operation of the driving assistant device according to the embodiment of the present invention.
Figure 4:
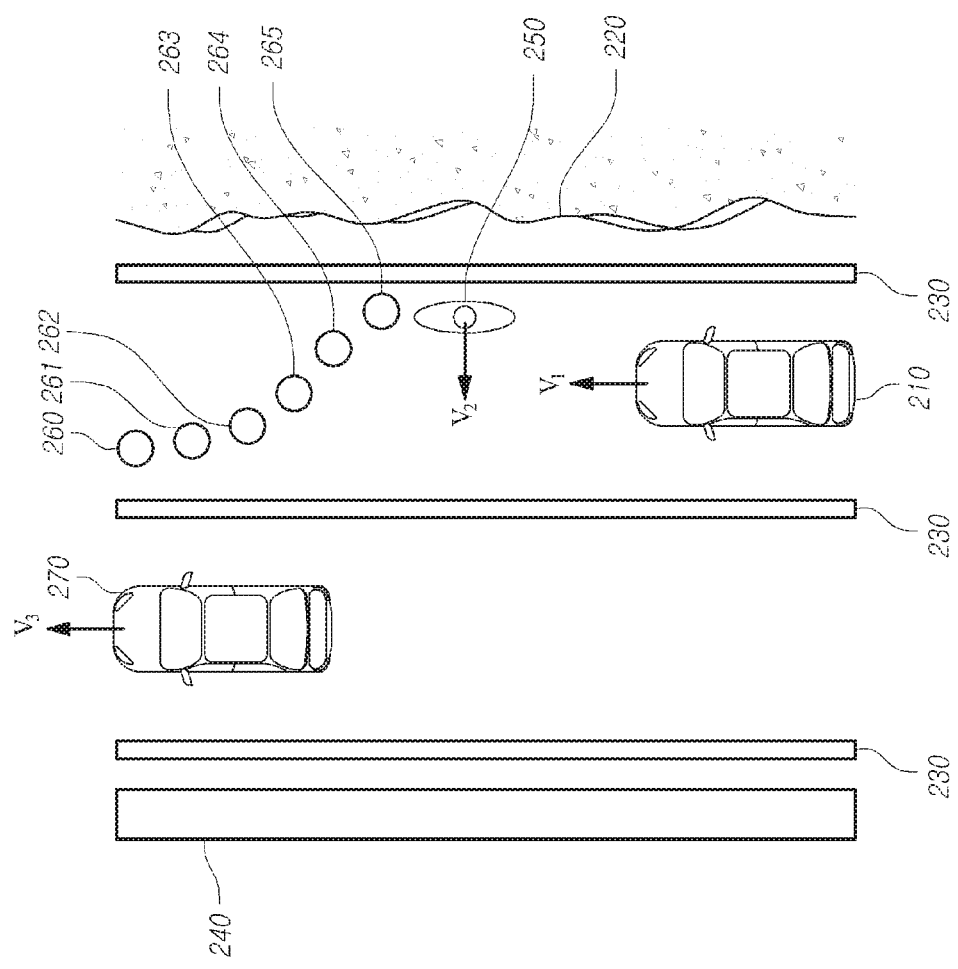
FIG. 4 illustrates another example of a situation for describing an operation of the driving assistant device according to the embodiment of the present invention.

FIG. 2 illustrates an example of a situation for describing an operation of the driving assistant device according to the embodiment of the present invention, FIG. 3 illustrates an example for describing an operation of the driving assistant device according to the embodiment of the present invention, and FIG. 4 illustrates another example of a situation for describing an operation of the driving assistant device according to the embodiment of the present invention.

FIG. 2 illustrates a situation where a driver's car 210 is running on a two-lane road including an edge 220 of the road, which is an end in a transverse direction (perpendicular to a longitudinal direction in which the driver's car is running), lanes 230, and a median strip 240 as street furniture. Further, rubber cones 260 to 265 are placed in a second lane of the road for repair work or the like, a pedestrian 250 is attempting to cross the road, and another car 270 is running on a first lane of the road.

Referring to FIG. 3 in the situation of FIG. 2, the detection unit of the driving assistant device according to the embodiment of the present invention may detect at least one of the edge 220 of the road, the lanes 230 of the road, and objects 240, 250, 260 to 265, and 270 positioned within a certain range on the road (S300).

When the detection unit performs operation S300, the calculation unit may calculate distance and speed with respect to at least one of the edge 220 of the road, the lanes 230 of the road, and the objects 240, 250, 260 to 265, and 270 positioned within the certain range on the road, which are detected in S300, (S310) and may calculate TTC based on the calculated distance, speed, and the speed of the driver's car 210 (S320).

Referring further to FIG. 4, when the detection unit detects the other car 270 as an object in operation S300, the calculation unit may calculate the distance from the other car 270 at regular intervals in operation S310 and may calculate the speed ($V_3$) of the other car 270 based on a change in the distance from the other car 270 for a certain period of time and the certain period of time. Further, the calculation unit may calculate the TTC ($T_3$) with the other car 270 based on the distance ($L_3$) from the other car 270 and the speed ($V_3$) of the other car 270, which are calculated in operation S310, and the speed ($V_1$) of the driver's car 210 according to Equation 1 below.

$$T_3 = L_3/(V_3 - V_1) \quad \text{[Equation 1]}$$

As the TTC with the other car 270 is calculated using Equation 1, respective TTCs with the edge 220 of the road, the lanes 230, the median strip 240 as street furniture, the pedestrian 250, and the rubber cones 260 to 265 may be calculated.

Since the driver's car 210 including the driving assistant device according to the embodiment of the present invention is moving, it may be difficult to calculate the change in the distance from the other car 270 for the certain period of time. However, the change in the distance may be calculated first according to the moving driver's car 210 based on not the other car 270 in motion but at least one of stationary street furniture including the median strip 240, the lanes 230, the edge 220 and the rubber cones 260 to 265, thereby calculating not only the change in the distance from the other car 270 in motion but also a change in the distance from the pedestrian 250 for the certain period of time.

As described above, when the respective TTCs with the edge 220, the lanes 230 of the road, and the objects 240, 250, 260 to 265, and 270 positioned within the certain range on the road are calculated in operation S320, the management unit may set respective risk levels of the edge 220, the lanes 230 of the road, and the objects 240, 250, 260 to 265, and 270 positioned within the certain range on the road and may adjust the risk levels of the edge 220, the lanes 230 of the road, and the objects 240, 250, 260 to 265, and 270 positioned within the certain range on the road by further applying the TTCs calculated in operation S320 (S330).

The risk levels may be set on the basis of data stored based on results that happen when the driver's car 210 moves to touch an object or further moves. Specifically, when the driver's car 210 steps on or crosses a lane 230, a traffic accident is less likely to happen, and thus the lanes 230 may be classified as a low risk level. On the contrary, when the driver's car 210 touches the pedestrian 250 or further moves to hit the pedestrian 250, the pedestrian 250 may be injured, or even die depending on a situation, and thus the pedestrian 250 may be classified as a high risk level.

Further, the management unit may adjust the risk levels of the edge 220, the lanes 230 of the road, and the objects 240, 250, 260 to 265, and 270 positioned within the certain range on the road based on a relationship between the TTCs calculated in S320 and preset time zones.

For example, when time zones ($T_1$, $T_2$, $T_3$) are preset such that $0\ [s] \le T_1 < 1\ [s]$, $1\ [s] \le T_2 < 3\ [s]$, and $3\ [s] \le T_3$, the management unit may raise the risk level of a target by two levels when TTC calculated in operation S320 corresponds to $T_1$, and may raise the risk level of the target by one level when the TTC corresponds to $T_2$. Here, time zones and the number of levels raised in each time zone may be set different for the edge 220, the lanes 230 of the road, and the objects 240, 250, 260 to 265, and 270 positioned within the certain range on the road.

As described above, when the risk levels of the edge 220, the lanes 230 of the road, and the objects 240, 250, 260 to 265, and 270 positioned within the certain range on the road are determined, the control unit may control one or more of the indicator, the steering system, the brake, the headrest, and the belt included in the driver's car 210 according to the determined risk levels (S340).

For example, the control unit may control the indictor to provide a notification to the driver, may control the steering system or brake to prevent a collision with one or more of the edge 220, the lanes 230 of the road, and the objects 240, 250, 260 to 265, and 270 positioned within the certain range on the road, and may control the headrest and the belt so that the driver has less impact.

Figure 5:
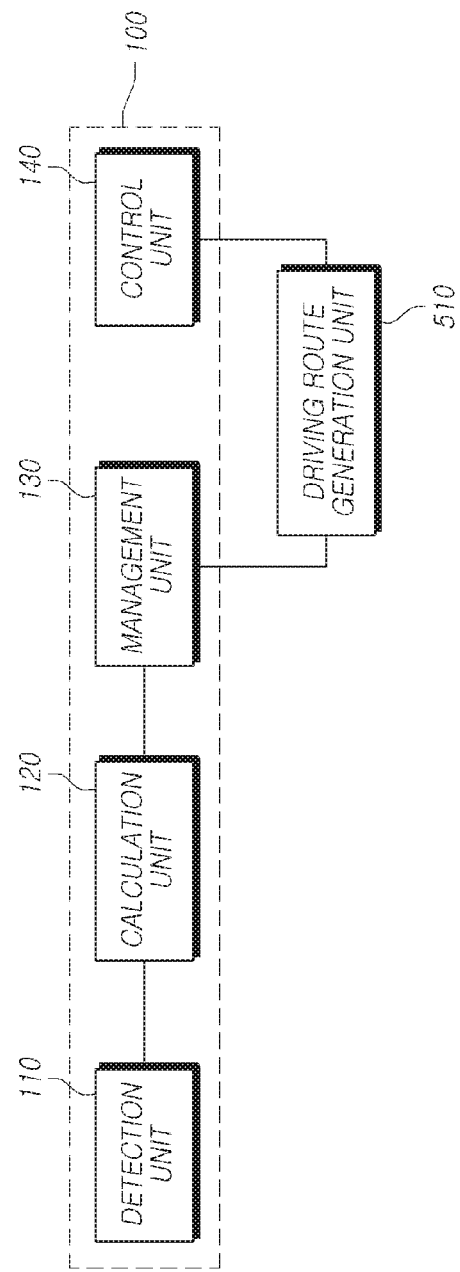
FIG. 5 illustrates a configuration of a driving assistant device according to another embodiment of the present invention.

FIG. 5 illustrates a configuration of a driving assistant device according to another embodiment of the present invention.

Referring to FIG. 5, the driving assistant device according to the other embodiment of the present invention may further include a driving route generation unit 510 in addition to the detection unit 110, the calculation unit 120, the management unit 130, and the control unit 140 included in the driving assistant device 100 according to the embodiment of the present invention.

The driving route generation unit 510 may generate a driving route based on at least one of the distance from the edge, the distance from the lane, the distance from the object, and the speed of the object, which are calculated by the calculation unit 120. Here, when no driving route is generated depending on a road condition, the driving route generation unit 510 may generate a driving route based on at least one of the distance from the edge, the distance from the lane, the distance from the object, and the speed of the object, which are calculated by the calculation unit 120, with reference to the risk levels managed by the management unit 130.

For example, in a situation where the management unit 130 manages the risk level of a pedestrian as one of the objects as risk level 4 and manages a lane, street furniture, a vehicle, and a thing, other than the pedestrian, as risk level 1 to risk level 3, when the driving route generation unit 510 is unable to generate a driving route which satisfies the distance from the edge, the distance from the lane, the distance from the object, and the speed of the object, which are calculated by the calculation unit 120, the driving route generation unit 510 may generate a driving route which focuses on distance and speed relative to the pedestrian as the highest risk level.

The control unit 140 may control the steering system and brake included in the driver's car so as to drive according to the driving route generated by the driving route generation unit 510.

Figure 6:
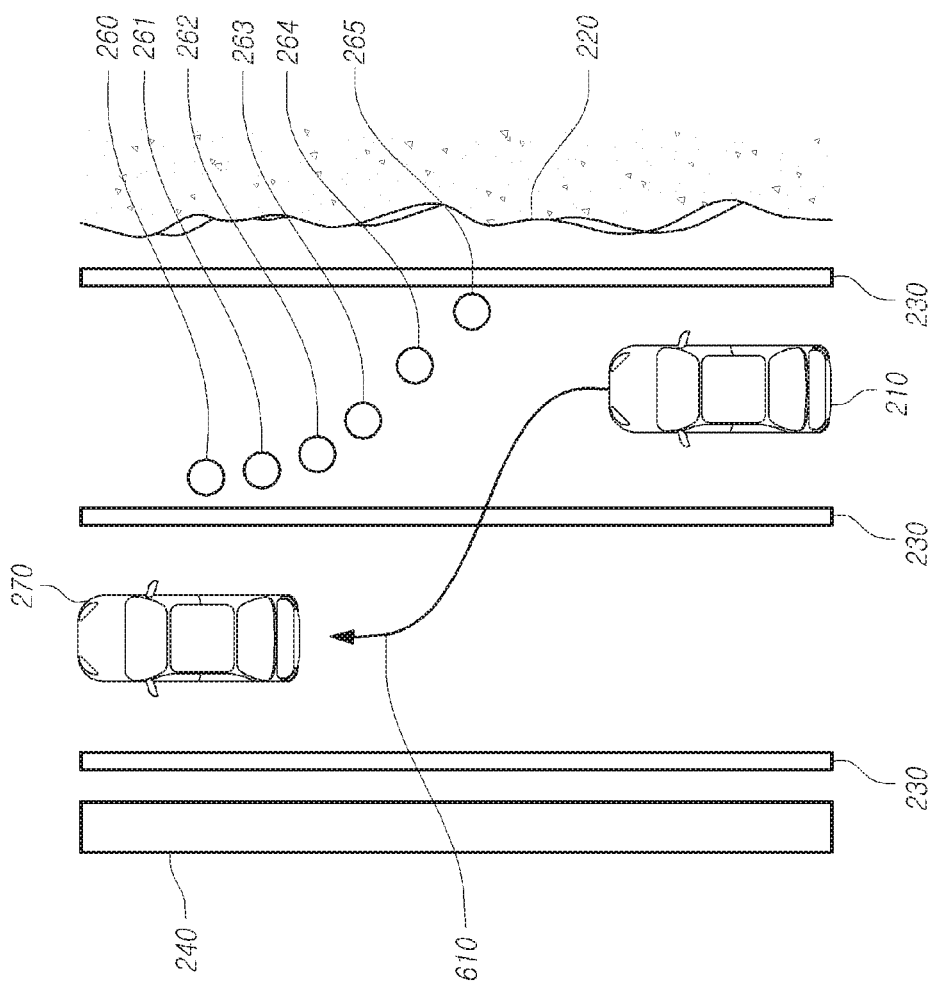
FIG. 6 illustrates one example for describing an operation of a driving route generation unit according to the other embodiment of the present invention.
Figure 7:
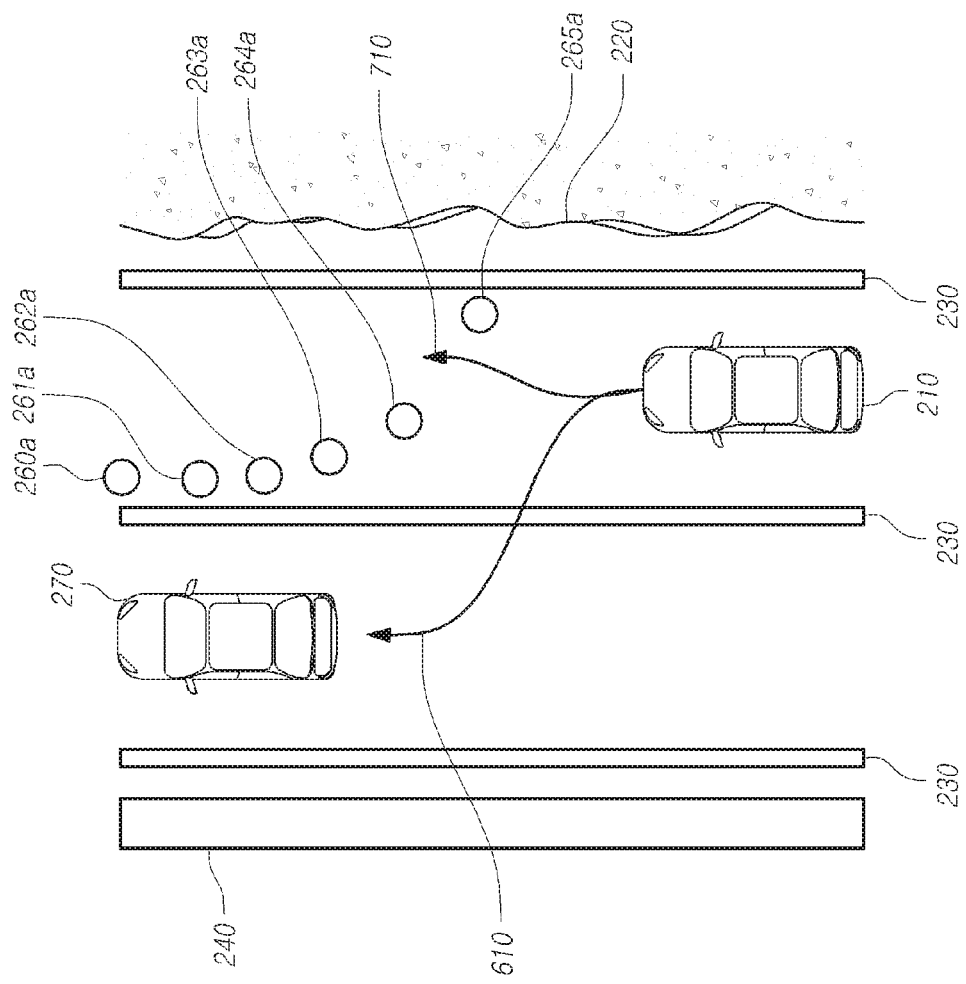
FIG. 7 illustrates another example for describing an operation of the driving route generation unit according to the other embodiment of the present invention.

FIGS. 6 and 7 illustrate one example and another example for describing an operation of the driving route generation unit according to the other embodiment of the present invention.

Referring to FIGS. 6 and 7, the driving route generation unit may generate a driving route 610 based on at least one of the distance from the edge 220, the distance from the lanes 230, the distance from the median strip 240 as one of the objects, the distance from the rubber cones 260 to 265 as one of the objects, the distance from the other car 270 as one of the objects, and the speed of the other car 270, which are calculated by the calculation unit.

If a collision with the other car 270 is likely to happen when the driver's car 210 changes the driving lane to a first lane, the driving route generation unit may not generate a driving route. For example, the driving route generation unit may expect the collision based on data on the difference between the speed of the other car 270 and the speed of the driver's car 210 and the distance from the other car 270. The data may be characterized in that the probability of a collision with the other car 270 increases with a greater difference between the speed of the other car 270 and the speed of the driver's car 210 and with a shorter distance from the other car 270.

Meanwhile, as illustrated in FIG. 7, when a gap between rubber cones 260a, 261a, 262a, 263a, 264a, and 265a is greater than the width of the driver's car 210, the driving route generation unit may generate driving routes 610 and 710, which may cause a problem that the driver's car 210 runs along the generated route 710.

To prevent the occurrence of such a problem, the detection unit according to the other embodiment of the present invention may detect the same objects as one group.

Figure 8A:
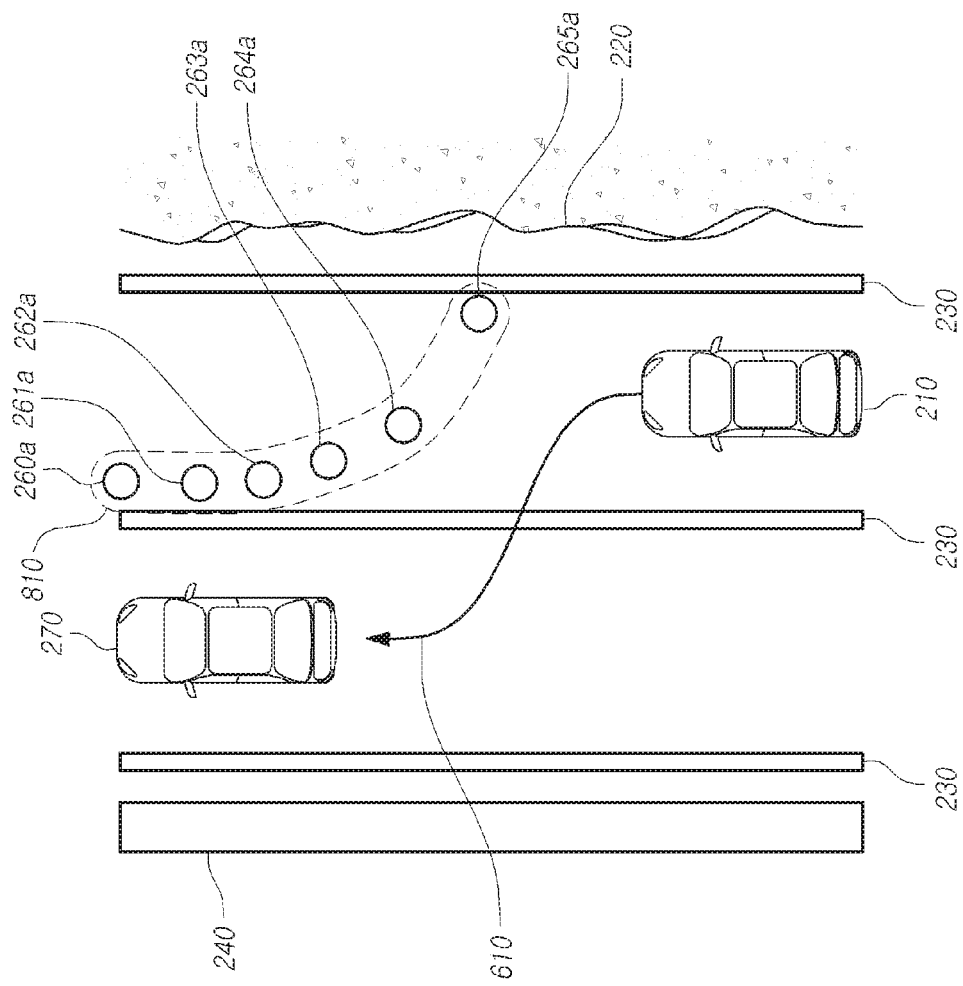
FIG. 8A illustrates one example for describing an operation of a detection unit according to the other embodiment of the present invention.
Figure 8B:
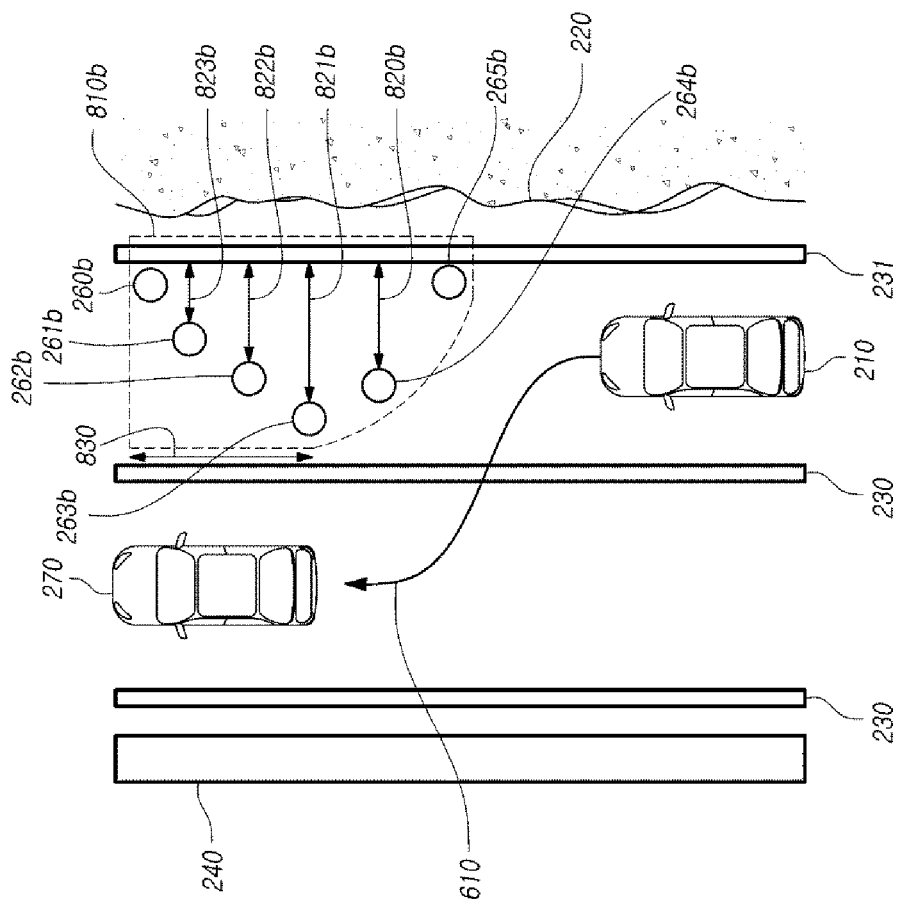
FIG. 8B illustrates one example for describing an operation of the detection unit according to the other embodiment of the present invention.

Accordingly, an operation of the detection unit according to the other embodiment of the present invention is described with further reference to one example and another example illustrated in FIGS. 8A and 8B.

As illustrated in FIG. 8A, when the number of the same objects, which are rubber cones 260a, 261a, 262a, 263a, 264a, and 265a, is a preset threshold or greater, the objects may be detected as one group 810.

Accordingly, the driving route generation unit may generate a driving route 610 only.

Alternatively, as illustrated in FIG. 8B, the detection unit may detect, as one group 810b, a region including a lane 231 adjacent to a rubber cone 265b as an object positioned within a short range from the driver's car 210 and rubber cones 260b, 261b, 262b, 263b, 264b, and 265b as the same objects, and although distances 820b, 821b, 822b, and 823b between the adjacent lane 231 and the rubber cones (objects) decrease (for example, from 821b to 822b, and 823b), the transverse length (width) of the region may be maintained for a preset longitudinal length 830.

Accordingly, even though there is a plurality of repair work sections, and rubber cones are installed in each repair work section, the detection unit may accurately separate and detect regions of the respective repair work sections. Thus, the driving route generation unit may generate a driving route 610 that is steadily maintained. That is, the driver's car 210 moving along the driving route 610 may run safely.

Although FIGS. 6 to 8B illustrate a rubber cone as an object, any object with a certain height or greater may be illustrated, without being limited thereto.

Figure 9A:
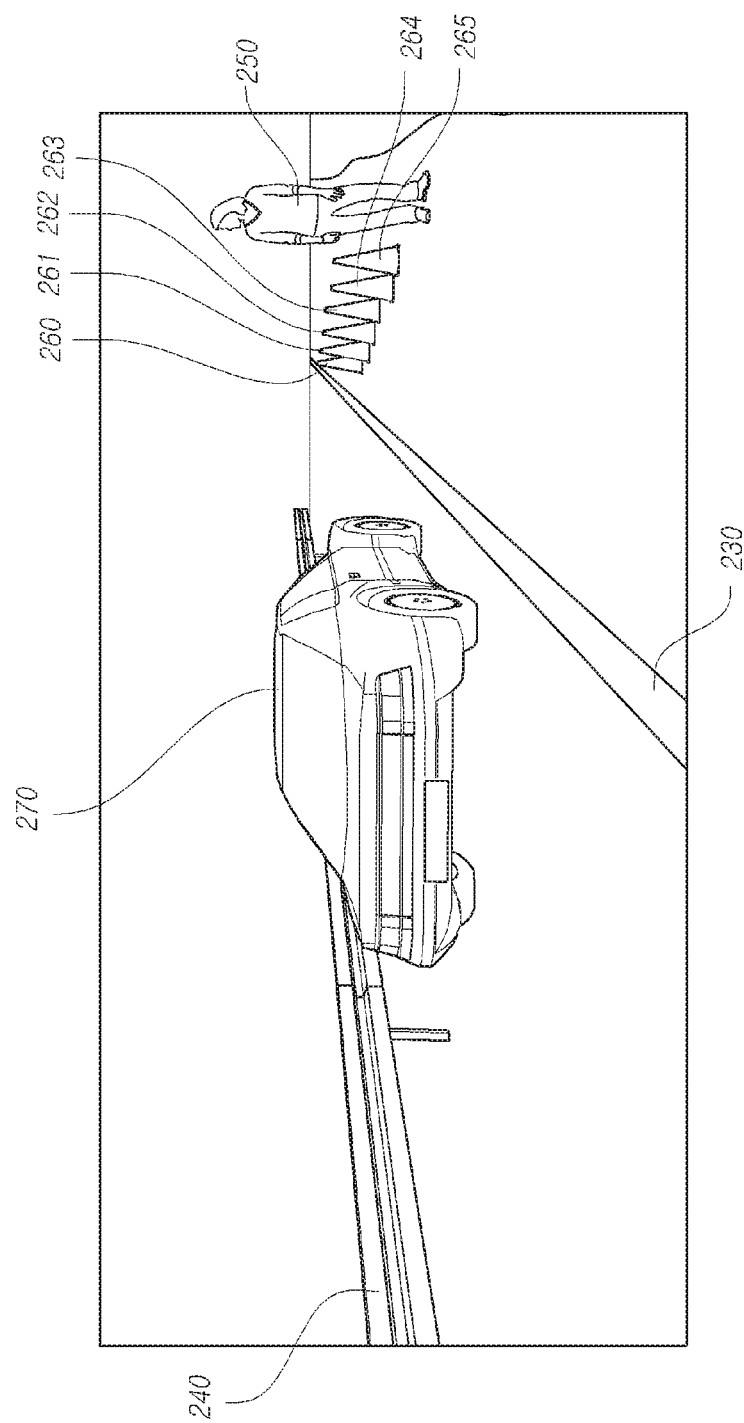
FIG. 9A illustrates another example for describing an operation of the detection unit according to the embodiment of the present invention.

FIGS. 9A and 9B illustrate one example and another example for describing an operation of the detection unit according to the embodiment of the present invention.

Referring to FIG. 9A, the detection unit that detects the front of the driver's car may detect the lane 230 of the road, the median strip 240 as an object, the pedestrian 250, the rubber cones 260, 261, 262, 263, 264, and 265, and the other car 270.

In the situation of FIG. 9A, as illustrated in FIG. 9B, the detection unit according to the embodiment of the present invention may detect a lane 910 of the road, a median strip 920, a pedestrian 930, rubber cones 940, 941, 942, 943, 944, and 945, and another car 950 as one recognition region. Accordingly, the detection unit does not include information on colors and shapes and thus may use a smaller data space, and the calculation unit may involve less time in calculating distance and speed.

In addition, the detection unit may further detect the road on which the driver's car is running. For example, when the surface of the road is detected as even, the detection unit may detect that the road is a paved road. When the surface of the road is detected as uneven, however, the detection unit may detect that the road is an unpaved road. The control unit may control at least one of the indicator, the steering system, the brake, the headrest, and the belt included in the driver's car according to the road detected by the detection unit. For example, when the detection unit detects an unpaved road, the control unit may control the indicator to notify the driver of the unpaved road and may control the steering system not to drastically operate. Further, the control unit may control the brake so that wheels at both sides have the same speed and may control the headrest and the belt so that the driver has less impact.

Hereinafter, a driving assistant method that is an operation performed by the driving assistant device described with reference to FIGS. 1 to 10 is described briefly.

Figure 10:
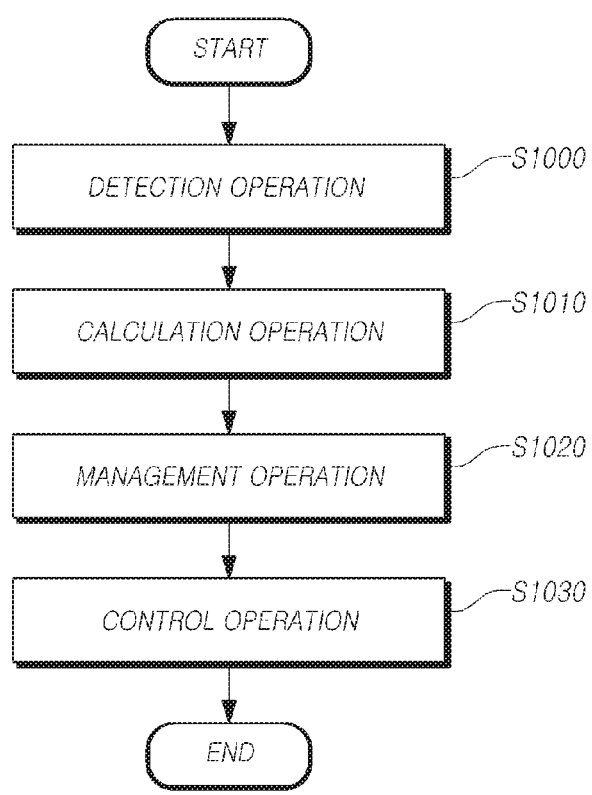
FIG. 10 is a flowchart illustrating a driving assistant method according to an embodiment of the present invention.

FIG. 10 is a flowchart illustrating the driving assistant method according to an embodiment of the present invention.

Referring to FIG. 10, the driving assistant method according to the embodiment of the present invention may include: a detection operation (S1000) of detecting at least one of an edge of a road, a lane of the road, and an object positioned within a certain range on the road; a calculation operation (S1010) of calculating the distance from the edge, the distance from the lane, the distance from the object, and the speed of the object, and of calculating TTC with each of the edge, the lane, and the object based on the calculated distances and speed; a management operation (S1020) of setting a risk level of at least one of the edge, the lane, and the object of the road, and of adjusting the risk level based on the TTC; and a control operation (S1030) of controlling at least one of an indicator, a steering system, a brake, a headrest, and a belt according to the risk level.

For example, the detection operation (S1000) may detect the edge, the lane, and the object of the road using a CCD camera that employs a CCD.

The CCD is a sensor that converts light into electric charges to obtain an image, and includes a circuit in which a plurality of condensers is connected to each other in pairs and each condenser transfers fully accumulated electric charges to adjacent condensers to obtain an image. When a CCD chip formed of CCDs is exposed to light, electrons are generated according to the amount of photons and information of the amount of electrons in a corresponding CCD corresponding to brightness is restructured, thereby generating image information forming a screen.

For another example, the detection operation (S1000) may detect the edge, the lane, and the object of the road using a stereo-camera that is equipped with two lenses to obtain two images at the same time. For easier understanding, the stereo-camera may detect an object in a similar manner such that people detect an object with the eyes to determine distance. The stereo-camera may detect an object in three dimensions using the lenses installed right and left side by side at an interval of about 6.5 to 7 cm, similar to the distance between the human eyes (about 6 to 7 cm).

The object may be street furniture installed on the road, a pedestrian or bicycle rider crossing the road, a car running on the road, and a thing placed on the road. The thing may be detected in the detection operation (S1000) but is not included in a list of items previously stored.

As described above, the detection operation (S1000) may use the CCD camera or stereo-camera to detect the edge, the lane of the road, and the object positioned within the certain range on the road but is not limited thereto. That is, the detection operation (S1000) may use any device that is capable of detecting an edge of a road, a lane of the road, and an object positioned within a certain range on the road.

The calculation operation (S1010) may calculate the distances from the edge, the lane of the road, and the object positioned within the certain range on the road, which are detected in the detection operation (S1000).

For example, the calculation operation (S1010) may calculate the distances using distances from a known position in advance on images taken in the detection operation S1000.

Further, the calculation operation (S1010) may detect the edge, the lane of the road, and the object positioned within the certain range on the road at regular intervals, thereby calculating the changed distances from the edge, the lane of the road, and the object positioned within the certain range on the road for a certain period of time. In addition, the calculation operation (S1010) may calculate the speeds of the edge, the lane of the road, and the object positioned within the certain range on the road, respectively, and may further calculate TTCs respectively with the edge, the lane of the road, and the object positioned within the certain range on the road based on the changed distances and the speeds.

The management operation (S1020) may set the risk level of each of the edge, the lane of the road, and the object positioned within the certain range on the road, which are detected in the detection operation (S1000).

For example, the management operation (S1020) may set the risk level of each of the edge, the lane of the road, and the object positioned within the certain range on the road based on preset risk level data by item.

Specifically, when a driver's car steps on or crosses a lane classified as a low risk level, a traffic accident may occur depending on a situation, which may be less likely to happen. On the contrary, when the driver's car touches a pedestrian classified as a high risk level or further moves to hit the pedestrian, the pedestrian may be injured, or may even die depending on a situation. Accordingly, the management operation (S1020) may set higher risk levels for the lane, street furniture and thing, the edge of the road, a vehicle, and a pedestrian in ascending order.

Further, the management operation (S1020) may adjust the risk level set for each of the lane, street furniture and thing, the edge of the road, the vehicle, and the pedestrian based on the TTCs calculated in the calculation operation (S1010).

For example, the management operation (S1020) may raise the risk level based on a relationship between TTCs and preset time zones. The time zones may be set differently for the lane, street furniture and thing, the edge of the road, the vehicle, and the pedestrian based on experimental data.

The control operation (S1030) may control at least one of the indicator, the steering system, the brake, the headrest, and the belt included in the driver's car according to the risk level managed in the management operation (S1020).

For example, when the management operation (S1020) manages the risk levels in four grades, the control operation (S1030) may: operate the indicator in risk level 1, which is the lowest risk level; control one or more of the indicator and the steering system in a next level, which is risk level 2; control one or more of the indicator, the steering system, and the brake in risk level 3; and control one or more of the indicator, the steering system, the brake, the headrest, and the belt in risk level 4, which is the highest risk level.

For another example, in a state where the management operation (S1020) sets the risk levels of the lane, the street furniture, the object, the edge of the road, the vehicle, and the pedestrian to be risk level 1, risk level 2, risk level 2, risk level 3, risk level 3, and risk level 4, respectively, when the detection operation (S1000) detects the lane, the street furniture, the object, the edge of the road, the vehicle, and the pedestrian, the control operation (S1030) may: control the indictor according to risk level 4, which is the highest risk level, to provide a notification to the driver; control the steering system to avoid a collision with the pedestrian corresponding to risk level 4; control the brake so as to avoid a collision with the pedestrian corresponding to risk level 4; and control to adjust the headrest and the belt so that the driver has less impact.

A driving assistant method according to another embodiment of the present invention may further include an operation of generating a driving route based on at least one of the distance from the edge, the distance from the lane, the distance from the object, and the speed of the object, and accordingly the control operation may control the steering system and the brake so as to move according to the generated driving route.

In the driving assistant method according to the other embodiment of the present invention, when a preset threshold number of the same objects or greater are detected, the detection operation may detect the same objects as one group.

In addition, the driving assistant methods of the present invention may perform all of the operations performed by the driving assistant devices of the present invention described with reference to FIGS. 1 to 9B.

Even when all the elements constituting an embodiment of the present invention have been described above as being combined into a single unit or combined to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A driving assistant method performed by driving assistant device having a stereo camera, the method comprising:
    detecting at least one of an edge of a road, a lane of the road, and an object positioned within a certain range on the road from an image captured by the stereo camera;
    calculating distance from the edge, distance from the lane, distance from the object, and speed of the object; and
    calculating time to contact with each of the edge, the lane and the object based on the calculated distances and speed;
    setting risk levels of the edge, the lane, and the object, and adjusting the risk levels based on the time to contact; and
    controlling at least one of an indicator, a steering system, a brake, a headrest, and a belt according to a highest level of the risk levels.

2. The method of claim 1, wherein the risk levels are adjusted based on a relationship between the time to contact and preset time zones.

3. The method of claim 1, further comprising
    generating a driving route based on at least one of the distance from the edge, the distance from the lane, the distance from the object, and the speed of the object,
    wherein the steering system and the brake are controlled so as to move a vehicle according to the driving route.

4. The method of claim 3, wherein when a preset threshold number of same objects or greater are detected, the same objects are detected as one group.

5. A driving assistant device comprising:
    a detection unit having a stereo camera, and configured to detect at least one of an edge of a road, a lane of the road, and an object positioned within a certain range on the road from an image captured by the stereo camera;
    a calculation unit connected with the detection unit, and configured to
        calculate distance from the edge, distance from the lane, distance from the object, and speed of the object, and
        calculate time to contact with each of the edge, the lane, and the object based on the calculated distances and speed;
    a management unit connected with the calculation unit, and configured to set risk levels of the edge, the lane, and the object and to adjust the risk level based on the calculated time to contact; and
    a control unit connected with the calculation unit and configured to control at least one of an indicator, a steering system, a brake, a headrest, and a belt according to the risk levels.

6. The driving assistant device as claimed in claim 5, wherein
    the object comprises street furniture, a pedestrian, a vehicle, and a thing placed on the road, and
    the management unit sets higher risk levels for the lane of the road, the street furniture and the thing, the edge of the road, the vehicle, and the pedestrian in ascending order.

7. The driving assistant device as claimed in claim 5, wherein the management unit raises the risk levels based on a relationship between the time to contact and preset time zones.

8. The driving assistant device as claimed in claim 5, wherein
    the management unit manages the risk levels in four grades, and
    the control unit:
        operates the indicator in risk level 1, which is a lowest risk level;
        controls one or more of the indicator and the steering system in a next level, which is risk level 2;
        controls one or more of the indicator, the steering system, and the brake in risk level 3; and
        controls one or more of the indicator, the steering system, the brake, the headrest, and the belt in risk level 4, which is a highest risk level.

9. The driving assistant device as claimed in claim 5, further comprising
    a driving route generation unit connected with the management unit and the control unit, and configured to generate a driving route based on at least one of the distance from the edge, the distance from the lane, the distance from the object, and the speed of the object,
    wherein the control unit controls the steering system and the brake so as to move a vehicle according to the driving route.

10. The driving assistant device as claimed in claim 9, wherein when a preset threshold number of same objects or greater are detected, the detection unit detects the same objects as one group.

11. The driving assistant device as claimed in claim 9, wherein the detection unit
    detects, as one group, a region including a lane adjacent to objects positioned within a predetermined range when a preset threshold number of the same objects or greater are detected in the region, and
    maintains, although distances between the adjacent lane and the objects decreases, width of the region for a certain distance.

12. The driving assistant device as claimed in claim 5, wherein the detection unit detects at least one of the edge, the lane, and the object as one recognition region.

13. The driving assistant device as claimed in claim 5, wherein
    the detection unit further detects a surface of the road, and
    the control unit controls at least one of the indicator, the steering system, the brake, the headrest, and the belt according to the surface of the road.

14. The driving assistant device as claimed in claim 5, wherein the control unit controls at least one of the indicator, the steering system, the brake, the headrest, and the belt according to a highest level among the risk levels.

* * * * *